Aug. 18, 1970 L. L. SMITH ET AL 3,524,934

PRIORITY CALLING COMMUNICATION SYSTEM TRUNK CIRCUIT

Filed Sept. 25, 1967 3 Sheets-Sheet 1

INVENTORS
WILLIAM C. MILLER
LESTER L. SMITH

BY Bernard E. Franz

ATTY.

Aug. 18, 1970 L. L. SMITH ET AL 3,524,934

PRIORITY CALLING COMMUNICATION SYSTEM TRUNK CIRCUIT

Filed Sept. 25, 1967 3 Sheets-Sheet 2

PRIORITY CALLING COMMUNICATION SYSTEM TRUNK CIRCUIT

Filed Sept. 25, 1967 3 Sheets-Sheet 3

3,524,934
PRIORITY CALLING COMMUNICATION SYSTEM TRUNK CIRCUIT

Lester L. Smith, McHenry, and William C. Miller, Glenn Ellyn, Ill., assignors to Automatic Electric Laboratories, Inc., Northlake, Ill., a corporation of Delaware Filed Sept. 25, 1967, Ser. No. 670,032
Int. Cl. H04m *3/38*
U.S. Cl. 179—18 8 Claims

ABSTRACT OF THE DISCLOSURE

A communication switching system having a plurality of exchanges of the common control type interconnected by trunk lines terminated at each exchange in the trunk circuit. The trunk circuit includes facilities for recognizing and for forwarding particular types of supervisory signals constituting an indication of the preemption of the facilities for a higher priority message, forwarding this signal to tandem connected exchanges and then dropping the switching matrix path and connector itself to the common control equipment for further processing.

BACKGROUND OF THE INVENTION

Field of invention

This invention relates in general to communications systems and more particularly to an automatic system for completing priority message paths where trunk lines or channels are in use for lower priority messages.

Description of the environment of the invention

The invention may be incorporated in the Communication Switching System disclosed in the U.S. Pat. No. 3,328,534 granted June 27, 1967, to R. J. Murphy et al. the disclosure of which is hereby incorporated by reference. This system, shown in the block diagram of FIG. 4, is essentially a tandem exchange, but there are some subscriber stations which are served directly. The exchange comprises a switching network or switch matrix consisting of a five-stage non-blocking network including stages A, AB, BB, BC and C in which each terminal circuit has an appearance on both sides of the network. The switch terminals are connected to terminal circuits such as line circuits, junctors or trunk circuits. There are a maximum of two thousand terminals, and the terminal circuits are numbered in groups with a maximum of one hundred groups and a maximum of one hundred terminal circuits in each group. It will be seen that there are many more possible numbers than the maximum number of terminals, which permits considerable flexibility in assigning numbers. There is no necessary relation between the number assigned a terminal circuit and the physical location of its connection on the switch matrix. In the numbering plan all terminal circuits of the same nature are assigned the same group number. FIG. 4 shows a local line 410 to serve a subscriber station and an interoffice trunk 412 extending to another similar exchange.

The exchange also includes a dial assistance switchboard 413 which may have several positions. This switchboard is provided with its own switching network or matrix and marker 414.

The switch matrix is controlled by a switch marker 12 which comprises a trunk control and data transfer unit 415, a connection and path control unit 416, a terminal circuit identifier or inlet-outlet control 417, sequence and supervisory circuits 418 and a common time generator (not shown).

The common control apparatus 14 supplies the register sender, translator, and other common control functions for the exchange. Register-sender junctors are provided, though not shown, to connect the switch matrix to the common control apparatus. Each of these junctors has two terminals and corresponding terminal circuits at the switch matrix.

All of the lines and their connections through the switching matrices are on a four wire basis. Transmission and signaling equipment with E and M signaling is provided for all lines and trunks leaving the exchange.

For terminal circuit identification on originating calls, and for trunk control, a set of conductors from trunk control 415 and identifier 417 is connected in multiple to all of the switch matrix terminal circuits. The sequence and supervisory circuits 418 are connected via a set of conductors to the other units of the marker. Communication between the switch marker and the common control is provided by a set of conductors extending from the data transfer unit 415 to the common control 14.

In operation, an originating call on one of the lines (local, incoming, or dial service assistance switchboard) causes its terminal circuit to apply a call-for-service marking potential to one of the conductors of 415. This causes the switch marker 12 to actuate the identifier 417 to record the identity of the calling line in flip-flops in the data transfer unit 415. This identity is then transferred by way of the set of conductors to the common control 14. The common control apparatus selects an idle register-sender 421 and then via the set of conductor transfers the originating line number and the number of the register terminals of the associated junctor to the data transfer unit 415. This information via the identifier 417 and the trunk control unit 415 products signals which via the set of conductors actuate connect relays in the two terminal circuits, that of the originating line and that of the register terminal. Signals are then sent from the trunk control unit 415 via the set of conductors and the connect relays in the two terminal circuits and via the switch matrix to the connect and path control unit 416. The path selection operation then occurs in unit 416 and the connection between the two terminal circuits is established through the switch matrix. Dial tone or other ready-to-receive signal tones are then sent from the common control unit via the register terminal, through the switch matrix, and the originating line terminal to the calling line. Call signals are received via this connection from the calling line into the common control apparatus 14. For an outgoing call the common control apparatus then selects an idle outgoing trunk 412 and supplies the identity of that trunk and of the sender terminal via the set of conductors to the data transfer unit 415, to cause the marker to establish a connection between the sender terminal and the outgoing trunk terminal. After the completion of sending the common control equipment supplies the identity of the calling and called lines via the set of conductors to the marker to cause the connection to be established between these two terminals. The connections to the register terminal and the sender terminal are released. Of course, for a call terminating locally the sender connection is not required, and this step is omitted. Also with originating office control, the sender connection is not required in the tandem offices.

*Signaling and supervision.*—Most of the facilities used for inter-switch trunks and subscriber access lines are carrier-derived, and single-frequency signaling is the approved method of signaling; duplex, simplex, or composite signaling is used on all cable circuits. All these methods of signaling provide E and M lead operation; therefore the trunks are designed to meet only E and M signaling.

Supervision within the office is accomplished via an EC (extra control) lead switched through the matrix along with the transmit and receive pairs; full duplex signaling is provided over the single EC lead.

The tolerances of the timing circuits in the line and trunk circuits permit recognition of signals with up to 35 milliseconds distortion. Assuming a worst-case distortion of 5 milliseconds per office, this margin of safety will provide satisfactory operation with seven offices in tandem and all with the distortion in the same direction.

*Setting up a call.*—Referring to FIG. 1, if it assumed that a subscriber at a station served by Switch 1 initiates a call which is routed via Switch 2 to a station served by Switch 3, when the subscriber station goes off-hook, a "request for service" is initiated to the switch marker. The scanner associated with the switch marker determines the location of the call for service, and the group and line number associated with the calling subscriber. Once this number has been determined, the switch marker requests the association of a register from the common control. If a register is available, the common control indicates its location to the marker, via the data transmission path. The marker then hunts for an idle path from the subscriber (in the primary A stage) to the register (in the final C stage); when the idle path is established, the marker pulls the crosspoints associated with that path, thus connecting the subscriber station to the register. The marker releases from this connection and becomes available for other traffic.

Dial tone is now returned and the calling subscriber proceeds to key the called number. He may, if he believes it is required, key in a priority digit if he is entitled to do so in order to insure that this call will be given precedence in the selection of trunks, otherwise the call is handled as a routine call. Upon receipt of the necessary digits, the common control determines the translation and routing instructions for this call. Once the routing instructions have been determined, the common control requests the service of the marker. When the marker is associated with the common control via the data transmission path, the common control passes information to the marker, including the location of a sender and the identity of an outgoing trunk circuit T–1 to Switch 2. The marker now establishes a connection from the sender to the outgoing trunk circuit T–1. When the connection to the trunk circuit has been established, an off-hook indication (see FIG. 5) is transmitted to the distant office via the E and M leads of the trunk circuit. The distant office Switch 2 assigns an idle register to the incoming trunk circuit T–2 and returns a key pulse which indicates that the distant office is now ready to receive the digits.

The originating office now transmits the priority digit, a routing digit, and the first three address digits (each of these digits is confirmed before the next digit is transmitted). The distant office performs a code translation on the three address digits to determine whether more digits are required or whether this is a tandem call and routing to a trunk is necessary. If cut-through to a foreign office were required this would now occur in the distant office, and the originating office would receive a key pulse (KP), indicating that transmission of all digits should be reinitiated. The previous sequence of events occurs at each tandem link, until the terminating office is located.

In this call the terminating office (Switch 3) is reached from Switch 2, via trunk circuits T–3 and T–4 and the originating office (Switch 1) is requested to transmit all address digits. Once the sender has completed its function, the marker is called a third time, and is given the following information from the common control: the location number of the calling subscriber; the location number of the register; the location of the sender and the location number of the outgoing trunk. The marker drops the original connections between the calling subscriber and the register, and between the sender and the outgoing trunk; it establishes a connection from the calling subscriber direct to the outgoing trunk, and then releases from the connection.

Cut-through between the calling and called subscribers now occurs, and ringing tone is returned to both parties. When the called party answers, a signal on the E and M leads is transmitted through all switches associated with this connection, to indicate that both parties are off-hook, see line 2 of FIG. 5. During the conversation period, the supervision and priority of the call are stored in the segment of the common control's ferrite core memory that is associated with the line and trunk.

When one or both parties go on-hook, the associated line and trunk circuits are automatically released without calling the marker. This is again accomplished through supervision of the E and M leads; no other supervisory leads are used between switches.

BRIEF DESCRIPTION OF THE DRAWINGS

The foregoing and other advantages of the invention will be more apparent by reference to the following detailed description of an illustrative embodiment of the invention, when read in conjunction with the drawings, in which.

SUMMARY OF THE INVENTION

Briefly, according to the present invention, there is disclosed a trunk circuit having an arrangement capable of recognizing a signal consisting of a 360 ms. on-hook indication and then to execute the appropriate operations. Such a signal is called a pre-empt signal used to take over facilities in use at the time for messages of a lower priority, and is an important operation in military and in some civilian systems. The re-use of existing supervisory channels normally used for this on- and off-hook supervision eliminates the expense and attendant complication of providing additional signaling channels for this function. The re-use of the existing call supervisory channels is made possible by the provision of timing means operated responsive to the length of time a particular condition exists, to then condition appropriate other circuit elements, whereby the same channel is used to determine from the duration of the on-hook and the off-hook condition whether the trunk line is being seized, the called party has answered, or if the signal is a re-ring or wink start signal in addition to the pre-empt signal. This feature is operative irrespective of the direction from which the signal is received, whether it is from the matrix, the inter-office channel, or from the common control equipment.

Figure 1:
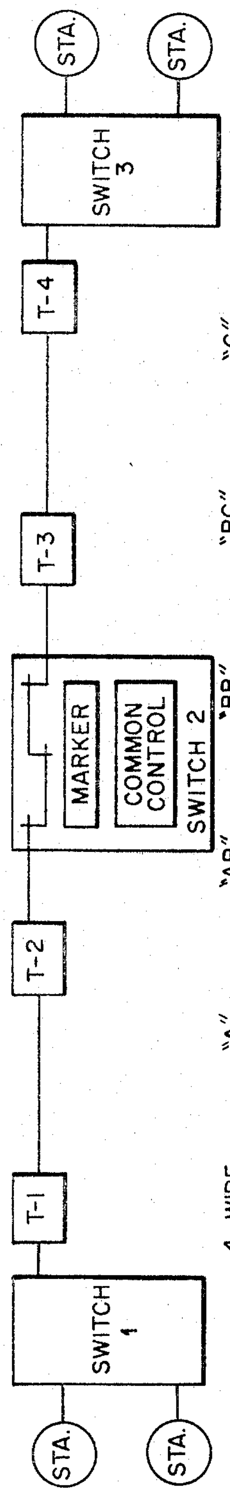
FIG. 1 is a block diagram showing a group of trunk line interconnected exchanges.
Figure 4:
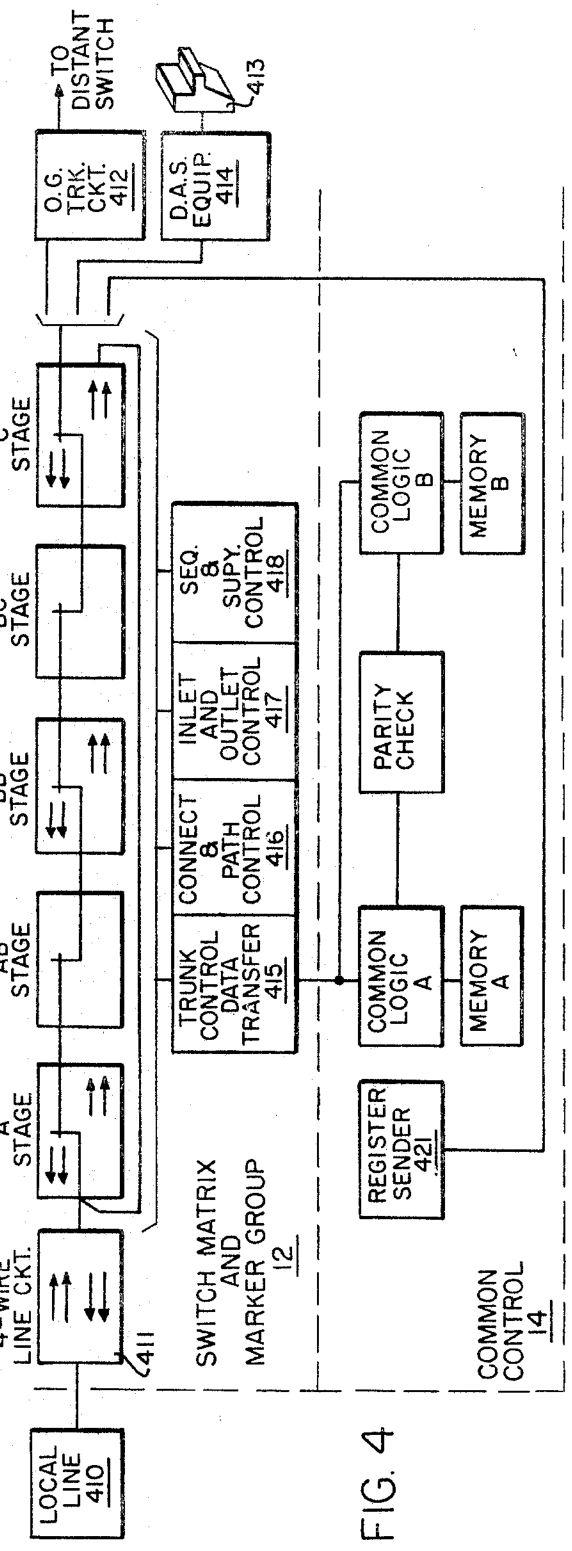
FIG. 4 is a block diagram showing the organization of the major functional circuits within a single office.
Figure 2:
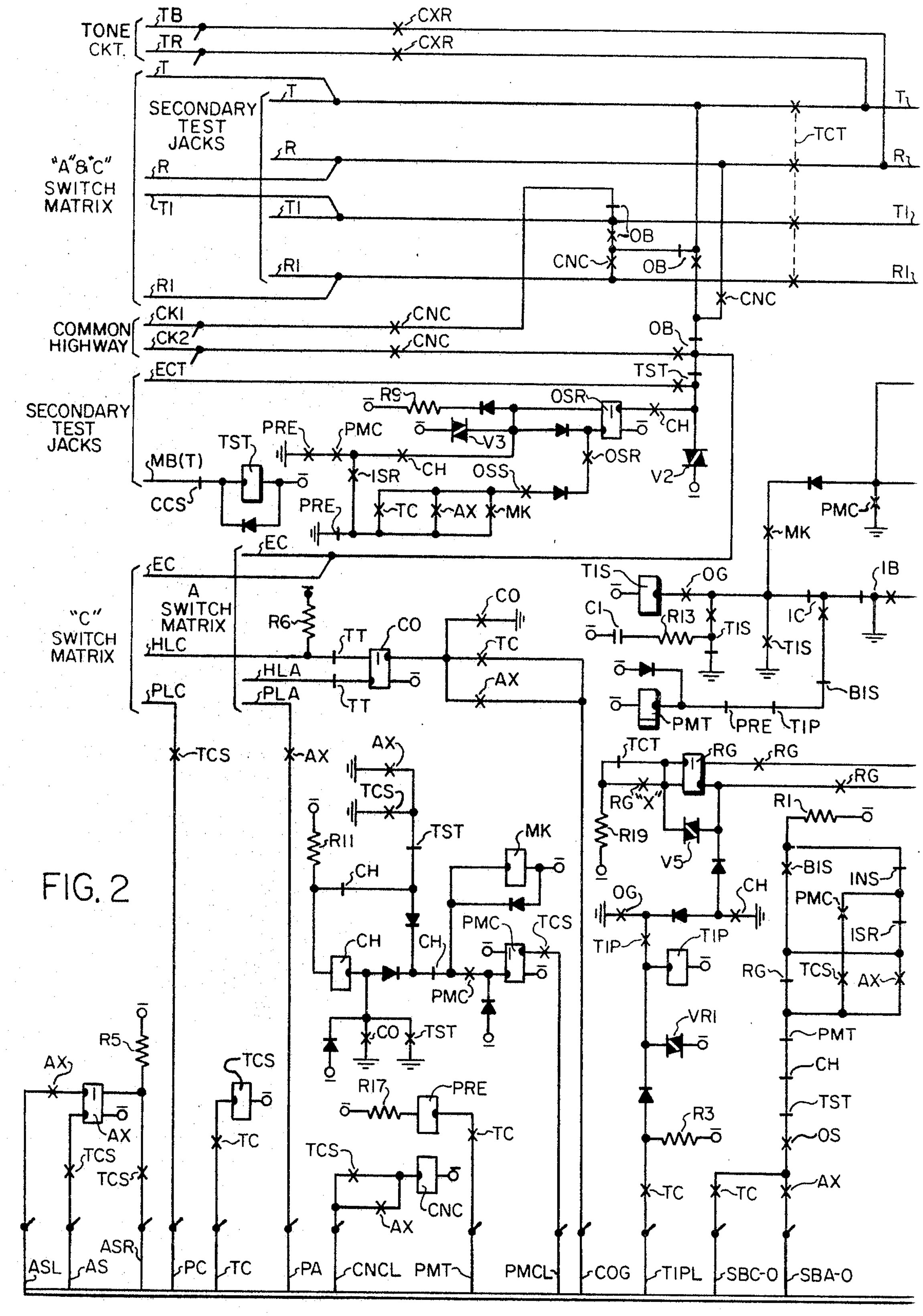
FIGS. 2 and 3 together comprise a schematic diagram of the trunk circuit.
Figure 3:
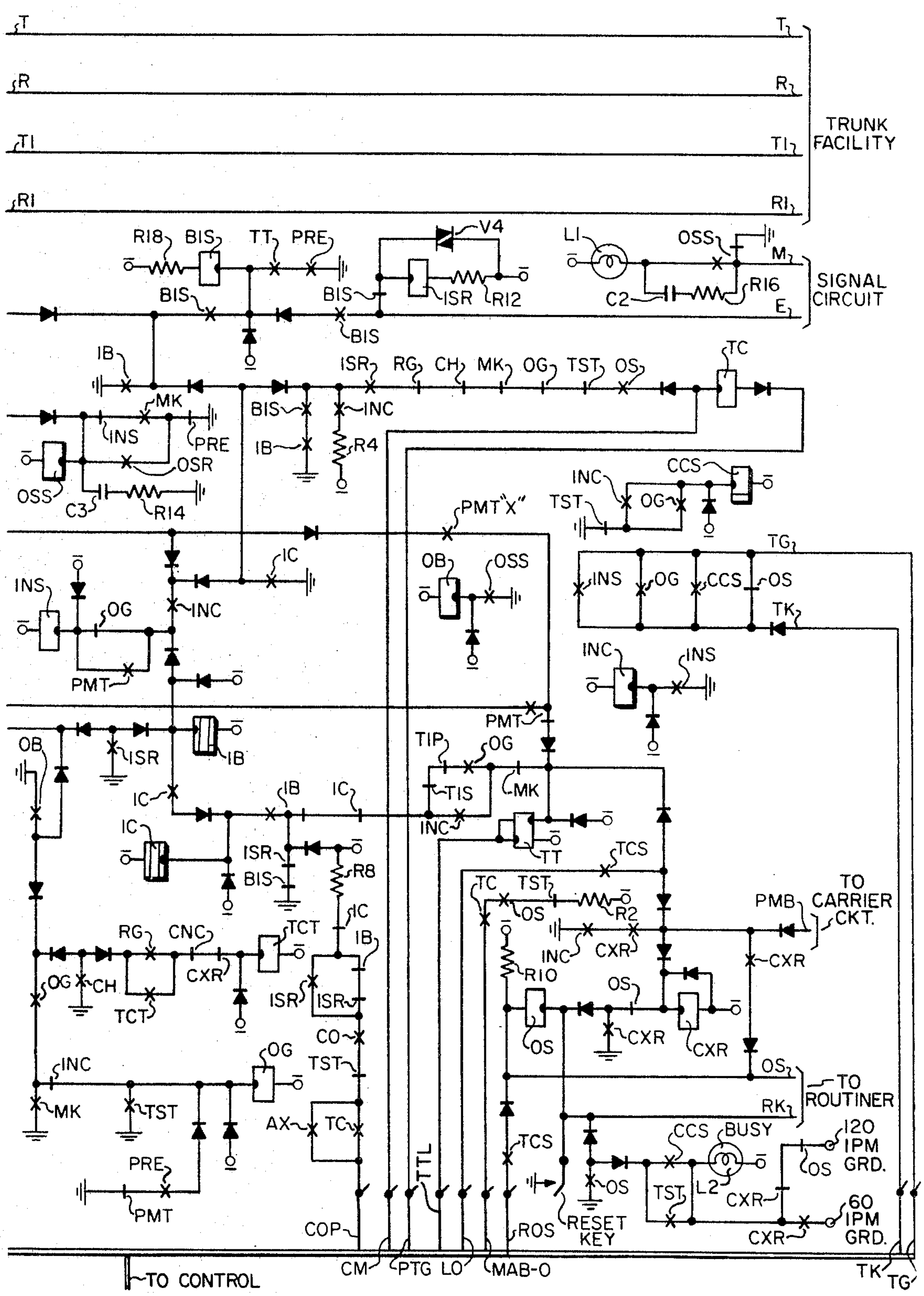

*Trunk circuit.*—The intertoll trunk circuits used in this switching system are all arranged for E and M signaling and four-wire directional transmission. Each circuit shown in FIGS. 2 and 3 is terminated on the switch matrix as shown in FIGS. 1 and 4 and is arranged to present information concerning its class, priority, idle or busy status, etc., to the switch marker and the common control, to aid in assignment and call processing. Each circuit also switches six wires for transmission and controls between the various circuits and switches.

The intertoll trunk circuits are used to interconnect to the transmission facilities between switches. These transmission facilities may be HF, VHF, UHF, troposcatter, microwave links, or land lines.

The circuit elements employed in the intertoll trunks are electromechanical or electromagnetic. Electromechanical elements (relays) are used for storage of information or "work horse" functions in these circuits. Electromagnetic switching devices with hermetically sealed contacts are used for the talking path because of their excellent transmission characteristics, and for interconnecting with electronic circuitry because they operate with the necessary speed (approximately 1 millisecond) for this interconnection. In addition, the extremely long life expectancy of the reed relays makes them ideally suited for applications requiring high repetition rates.

The trunk circuits consist of a combination of reed capsule relay devices and electromechanical telephone type twin-contact relays. Because of their operating speed and permanently low-resistance contacts, the reed relays are used when fast-operate and fast-release functions are required (1–3 millisecond operate, .5 millisecond release) and for closing the transmission path. The telephone type relays are used for normal "work horse" functions where large numbers of contacts are required, and also for slow-operate and slow-release functions, or where adjustable timing is required. Electronic components are incorporated into the circuits as timing elements.

*Priority pre-emption special handling.*—If the subscriber desires to exercise his priority privilege in accordance with the invention he will key or operate one of his priority keys before the address digits. This priority is then permanently associated with the connection in the common control portion of the memory associated with the trunk operation. The subscriber then proceeds to key the address of the called subscriber. If the subscriber exercises this priority operation and an all-trunk-busy (ATB) condition is encountered on the primary (direct) route, the originating office does not attempt to override existing connections until all existing alternate trunk routes have been attempted. Should all routes test busy, the switching machine will return to the primary route and attempt to override existing calls in that group. If no trunks of lower priority are detected in the primary group, the pre-empt process is repeated throughout the alternates.

When a switching center is functioning as a tandem point for calls, pre-emption can occur between the tandem point and the primary route to the destination. If no trunks of lower priority are detected on this primary route the call is returned to the originating switch for further routing.

Once the terminating switch is reached, and if the called line is found busy, the terminating switch will force the release of the existing connections (if of a lower priority) and establish a connection from the calling subscriber to the called line. The subscriber whose connection has been forcibly released will receive a distinctive tone indicating that pre-emption has occurred.

*Connections to marker and common control.*—The trunk circuits have many functions, such as CLR holding, priority ring, etc., that are dictated by the address dialed from the station. A common multiconductor switch terminal control path between the marker and the trunk circuits is used by the marker, under direction of the common control equipment, to load the required call conditions into these circuits.

A group of individual leads between the marker and the trunk circuits are used to originate requests for service and to complete calls. Another group of leads, individual to each circuit, are used to indicate busy status to the common control scanner.

Pre-empt of a line or trunk is initiated by the marker, under direction of the common control. The marker generates the precise pre-empt signal shown in the signaling diagram, and feeds this signal, via the switch terminal control path, to the circuit being pre-empted. The trunk circuit repeats the signal in both directions (toward calling and called terminations). At the end of the pre-empt cycle the marker signals the trunk to release the established connection, and proceeds to establish the new connection.

*Operations.*—On outgoing calls the trunk is first connected to a sender, to allow addressing the distant office. Upon completion of outpulsing, the sender is released and a connection is made to the originating line or trunk. The trunk circuit is arranged to pre-seize the distant office while the marker is completing its cycle, in order to reduce the time interval available for simultaneous seizure by the distant switch. If a simultaneous seizure should be detected before the marker completes its cycle, the trunk circuit is released and another trunk circuit selected.

On an incoming call, the trunk circuit signals the marker that service is requested; the marker connects it through the matrix to an idle register. Upon receipt of sufficient digits the common control requests the marker to release the register and make the final connection.

The trunk circuit monitors the supervisory signals that are repeated through it during the call. It must recognize called-party answer, disconnect from either end, and the pre-empt signal from the distant office, and it must distinguish re-ring and wink start signals from the pre-empt signal.

DESCRIPTION OF THE PREFERRED EMBODIMENT

General

In the following description of the circuit operation the circuit components bear a designation comprising a number followed by a functional letter designation. The number prefix indicates the figure of the drawing on which the component may be found. The designations as shown on the drawings do not include this prefix. Further, on the drawings the relay coils are shown with a heavy shading line on the bottom and right hand of the outline to aid in distinguishing them from the reed relay coils.

Outgoing call

*Sender to trunk connection trunk seizure (Reed relay 3OS normally operated).*—To seize this trunk circuit the marker connects resistance battery to lead 3PTG and ground to lead 3CM, to operate reed relay TC which connects lead 2PMT to reed relay 2PRE, resistance 2R1 battery to lead 2SBC–O, lead 2TC to reed relay 2TCS, resistance 3R2 battery to lead 3MAB–O, lead 3TTL to reed relay 3TT, lead 2COG to one side of the first winding of reed relay 2CO, and lead 2TIPL to reed relay 2TIP. The marker then grounds lead 2TC to operate reed relay 2TCS. Reed relay 2TCS in operating completes a circuit to operate reed relay 2MK, and connects lead 2AS to the second winding of reed relay 2AX, lead 2ASR to the first winding of reed relay 2AX, lead 2PC to lead 2PLC, lead 2PMCL to the first winding of relay 2PMC (lead 2PMCL grounded during pre-empt seizure), lead 3ROS to reed relay 3OS, lead 3LO to reed relay 3CXR, and lead 2CNCL to reed relay 2CNC. Reed relay 2MK in operating completes circuits to reed relay 3OG and relay 2OSS. Reed relay 3OG in operating completes circuits to reed relay 3CCS and relay 2TIS, and connects lead 3TG to lead 3TK. The marker then grounds lead 2AS to operate reed relay 2AX over the previously prepared path to the second winding, it then locks via its first winding and resistor R5 in series to ground from lead 2ASL to connect resistance battery to lead 2SBA–O, and to connect lead 2PA to lead 2PLA. Relay 3OSS operates to complete a circuit to relay 3OB and transfers lead 3M from its "normal" (grounded) to its "seized" (resistance battery) state. The marker removes ground potential from lead 2TC to release reed relay 2TCS, removes ground from lead AS (second winding of 2AX) and removes resistance battery from lead 3PTG and ground from lead 3CM to release reed relay 3TC, and in turn disconnect lead 2PMT (reed relay 2PRE) resistance 2R1 battery from lead 2SBC–O, lead 2TIPL from reed relay 2TIP, lead 3TTL from reed relay 3TT, resistance 3R2 battery from lead 3MAB–O, and lead 2TC from reed relay 2TCS. Reed relay 2TCS restores, and disconnects leads 2AS and 2ASR from reed relay 2AX, lead 3ROS from 3OS, lead 2PMCL from reed relay 2PMC, lead 3LO from reed relay 3CXR and lead 2PC from lead 2PLC. Relay 3CCS operates from the path prepared by reed relay 3OG, disconnects lead 2MB(T) from reed relay 2TST, and completes the circuit to light lamp 3BUSY. Relay 2TIS operates and locks. Relay 3OB operates. The function of relay 3OB is to prepare the circuitry for the shunting of leads T1 to R1 and T to R by reed relay 2CNC during the setting up of an outgoing connection.

Matrix operation (operated: Reed relays 3OS, 2AX, 3OG and 2MK; relays 3OSS, 3CCS, 2TIS and 3OB)

After an idle path is found through the matrix, the marker grounds lead 2CNCL to operate reed relay 2CNC which connects lead T to lead R, lead T1 to lead R1 over the path prepared 3OB, and lead 2CK2 to lead 2EC. The marker then connects battery to lead 2PA to "pull" the matrix.

When the matrix operates, resistance ground via the matrix is connected to lead 2HLA to operate reed relay 2CO which locks through its first winding places a shorting ground on the circuit to reed relay 2CH grounds lead 2COG, and connects resistance battery to lead 3COP. The marker now removes battery from lead 2PA and performs a continuity check.

Continuity check continuity good

If the continuity is good, the marker removes ground from lead 2CNCL, removing the operating potential of reed relay 2CNC. Reed Relay 2CNC upon restoring disconnects lead 2CK2 from lead 2ED, lead R from lead T, and lead R1 from lead T1. The marker removes ground from lead 2ASL removing the operating potential from reed relay 2AX which restores and removes resistance battery from lead 2SBA–O, disconnects lead 2PA from lead 2PLA, removes the short circuit from reed relay 2CH completing an operating path for reed relay 2CH in series with resistor 2R11, removes resistance battery from lead 3COP, disconnects lead 2CNCL from reed relay 2CNC, and removes ground from lead 2COG. Reed relay 2CH operates, opens the circuit to reed relay 2MK, connects reed relay 2OSR to lead 2EC, and completes the circuit to the second winding of relay 2RG in series with resistor 2R19. Relay 2RG operates to its "X" contacts and locks them, operates fully, and completes a circuit to reed relay 3TCT. Reed relay 3TCT connects leads T1, R1, T and R from the matrix to leads T1, R1, T and R of the trunk line respectively. The sender extends an "off-hook" signal via lead EC, to operate reed relay 20SR. After its slow-to-release interval due to diode 2CR5, reed relay 2MK restores.

Marker seizure (operated: Reed relays 3OS, 3OG, 2CO, 2CH, 3TCT and 2OSR; relays 3OSS, 3CCS, 2TIS, 2RG, and 3OB)

After the sender has completed its MF outpulsing, the marker again operates reed relay 3TC and 2TCS as during the initial trunk seizure. Then the marker grounds leads 3TTL and 2AS. Reed relay 3TT operates and disconnects leads 2HLA and 2HLC from reed relay 2CO, opening the circuit to 2CO and the matrix. Reed relay 2AX operates, locks in series with resistor 2R5 to ground from lead 2ASL, and connects lead 2PA to lead 2PLA. Reed relay 2CO restores, disconnects lead 3LO from reed relay 3TT, removes the ground potential from lead 2COG opens the circuit to reed relay 2CH, and removes resistance 3R8 battery from lead 3COP. The restoration of the matrix removes the short circuit from the first winding of reed relay 2OSR. Reed relay 2CH restores, disconnects lead 2EC from reed relay 2OSR, connects resistance 2R1 battery to leads 2SBA–O and 2SBC–O, opens the circuit to 3TCT, and closes a circuit to reed relay 2MK. Reed relay 2MK operates. Reed relay 3TCT restores, and disconnects leads R, T, R1 and T1 from leads R, T, R1, and T1, respectively. The marker removes ground from leads 3TT, 2AS, and 2TC, opening the circuits of reed relays 3TT, 2AX, and 2TCS, respectively, and removes ground from lead 3CM and resistance battery from lead 3PTG, opening the circuit of reed relay 3TC. Reed relay 3TT restores, and connects leads 2HLA and 2HLC to the second and first windings of reed relay 2CO respectively. Reed relay 2TCS restores, and disconnects lead 2PC from lead 2PLC, lead 2AS from the second winding of reed relay 2AX, lead 2ASR from the first winding of reed relay 2AS, lead 2PMCL from the first winding of reed relay 2PMC, lead 3ROS from reed relay 3OS, and lead 3LO from reed relay 3CXR. Reed relay 3TC restores, and disconnects lead 2SBC–O from resistance 2R1 battery, lead 2TIPL from reed relay 2TIP, lead 3MAB–O from resistance 3R2 battery, lead 3TTL from reed relay 3TT, lead 2TC from reed relay 2TCS, and lead 2PMT from reed relay 2PRE.

Matrix operation (operated: Reed relays 2AX, 3OS, 3OG, 2OSR and 2MK; relays 3OSS, 3CCS, 2RG, 2TIS and 3OB)

The marker next seizes the originating circuit and releases its connection through the matrix to the register. It then establishes a new connection through the matrix from the originating circuit to the interswitch trunk in a manner similar to that described with the exception that reed relay 2OSR is already operated, and the operation of reed relay 2CH completes a circuit to reed relay 3TCT since relay 2RG is operated.

Answer (operated: Reed relays 3OS, 3OG, 2CO, 2CH, 3TCT and 2OSR; Relays 3OSS, 3CCS, 2TIS, 2RG and 3OB)

An answer indication is received from the distant switch in the form of ground on lead 3E, operating reed relay 3ISR. Reed relay 3ISR completes a circuit to relay 3IB, extends an "off-hook" (ground) signal to lead EC (reed relay 2CH contacts are operated), thus short circuiting the first winding of 2OSR, and opens the circuit to relay TIS. Relay 3IB operates. Relay 2TIS after its slow-to-release interval provided by capacitor 2C1 and resistor 2R13 restores.

Release call party disconnects first (operated: Reed relays 3OS, 3OG, 2CO, 2CH, 3TCT, 2OSR and 3ISR; Relays 3OSS, 2RG, 3CCS, 3IB and 3OB When the called party disconnects, ground is removed from lead 3E releasing 3ISR. Reed relay 3ISR upon restoring, completes a circuit to relay 3IC, opens the circuit to relay 3IB, and repeats the "on-hook" signal to the originating circuit via lead 2EC, removing the short circuit from the first winding of reed relay 2OSR. Relay 3IC operates. After its slow-to-release interval, relay 3IB restores, opens the circuit to relay 3IC, and completes the circuit to relay 2PMT. Relay 2PMT operates to its "X" contacts, and then operates fully. After its slow-to-release interval, relay 3IC restores, opens the circuit of relay 2PMT, and completes the circuits to 3TT and 2TIS. Reed relay 3TT operates, and opens the circuit of 2CO and the matrix holding path. Reed relay 2CO restores, and opens the circuits of 3TT and 2CH. The restoration of the matrix removes resistance ground from lead 3EC, opening the circuit of 2OSR. Reed relay 3TT restores, and connects leads 2HLA and 2HLC to the windings of reed relay 2CO. Reed relay 2CH restores, disconnects lead 2EC from 2OSR, and opens the circuit to 3TCT. Reed relay 2OSR restores and opens the circuit to relay 3OSS. Reed relay 3TCT restores, and disconnects leads R, T, R1, and T1 from leads R, T, R1, and T1, respectively. Relay 2TIS operates and locks. Relay 3OSS restores, opens the circuit to relay 3OB and transfers lead 3M from its "seized" (resistance battery) to its "normal state (grounded) in order to release equipment at the distant switch. After its slow-to-release interval, relay 2PMT restores. After its slow-to-release interval, relay 3OB restores, and opens the circuits to 2RG and 3OG. Reed relay 3OG restores, and opens the circuits to relay 3CCS and 2TIS. Relay 2RG restores. Relay 2TIS restores. After its slow-to-release interval, relay 3CCS restores, connects lead 2MB to relay TST, extinguishes lamp 3BUSY, and disconnects leads 3TK and 3TG. The circuit is now at normal.

Calling party disconnects first

When the calling party disconnects, resistance battery via lead 2EC completes a circuit to the first winding of reed relay 2OSR in magnetic opposition to current flow in the second winding of 2OSR. Reed relay 2OSR restores and opens the circuit of relay 3OSS. Relay 3OSS restores, opens the circuit to relay 3OB, and transfers lead 3M from its "seized" to its "normal" state in order to release the equipment at the distant switch. After its slow-to-release interval, relay 3OB restores.

When the matrix holding path at this switch is opened, reed relay 2CO is released. Reed relay 2CO restores, and opens the circuit to reed relay 2CH. The restoration of the matrix opens the circuit to the first winding of 2OSR. Reed relay 2CH restores, disconnects lead 2EC from 2OSR, and opens the circuits to the second winding of 2OSR, 3TCT, and 3OG. Reed relay 3TCT restores, and disconnects leads R1, T1, R, and T from leads R1, T1, R, and T, respectively in the same manner as for a called party disconnect. Reed relay 3OG restores, opens the circuit to relay 3CCS, and completes the circuit to reed relay 3INS. Reed relay 3INS operates and completes an operating path to relay 3INC. Relay 3INC operates, and completes a new operating path to relay 3CCS before it restores.

When the matrix at the distant switch has restored, ground is removed from lead 3E, opening the circuit of 3ISR. Reed relay 3ISR restores, restoring the circuit to relay 3IC, and opens the circuits to relays 3IB and 2RG. Relay 3IC operates. Relay 2RG restores. After its slow-to-release interval, relay 3IB restores, closes the circuit to relay 2PMT, and opens the circuit to relay 3IC. Relay 2PMT operates to its "X" contacts, and operates fully. After its slow-to-release interval, relay 3IC restores, and opens the circuits of 2PMT and 3INS. Reed relay 3INS restores and opens the circuit to 3INC. Relay 3INC restores and opens the circuit to relay 3CCS. After its slow-to-release interval, relay 2PMT restores. After its slow-to-release interval, relay 3CCS restores, extinguishes lamp 3BUSY, and disconnects lead 3TG from lead 3TK. The circuit is now at normal.

Incoming call request for service (normally operated: Reed relay 3OS)

When this circuit is seized from the trunk facility, ground is connected to lead 3E to operate reed relay 3ISR, which completes operating circuits to relay 3IB and reed relay 3INS. Reed relay 3INS completes a circuit to relay 3INC, and connects lead 3TG to lead 3TK. Relay 3INC completes a circuit to relay 3CCS, and connects resistance 3R4 battery to lead 3CM to call for service to the marker. Relay 3CCS upon operating lights lamp 3BUSY.

Trunk to register connection (operated: Reed relays 3OS, 3ISR and 3INS; Relays 3IB, 3INC and 3CCS)

Trunk seizure for a trunk to register connection is identical to that described for a sender to trunk connection.

Matrix operation (operated: Reed relays 3OS, 3ISR, 3INS, 3TC, 2TCS and 2MK; Relay 3IB, 3INC and 3CCS)

After a path is found through the matrix to the register, the marker grounds lead 2CNCL to operate reed relay 2CNC which connects lead 2T1 to lead 2CK1, lead 2R to lead 2EC, and lead 2T to lead 2R1. The marker then connects battery to lead 2PC and ground to lead 2COG to "pull" the matrix. When the matrix operates, resistance battery via lead 2HLC operates reed relay 2CO through its first winding which then locks to ground from its own contacts, connects lead 3LO to 3TT, short circuits reed relay 2CH by placing ground on the inside terminal of its winding and connects resistance 3R8 battery to lead 3COP. The marker now removes battery from lead 2PC and ground from lead 2COG, and performs a continuity check as previously described.

Pre-empt (operated: Reed relays 3OS, 3ISR, 2CO, 3TCT, 2CH, 2OSR and either 3INS or 3OG; Relays 3IB, 3CCS, 3OSS, 2RG, 3OB and possibly 3INC)

*From Marker.*—When the inter-switch trunk is pre-empted by the marker, it must send a pre-empt signal to both calling and called parties before releasing the connection and establishing a new one. The calling and called line circuits recognize this signal and transmit "pre-empt tone" to the stations.

The marker connects resistance battery to lead 3PTG and ground to lead 3CM to operate reed relay 3TC just as for a normal trunk seizure. This connects lead 2PMT to reed relay 2PRE, lead 2TCL to reed relay 2TCS, resistance 3R10 battery to lead 3MAB–0, lead 3TTL to reel relay 3TT, lead 2COG to the first winding of reed relay 2CO, resistance 3R8 battery to lead 3COP, and lead 2TIPL to reed relay 2TIP. The marker grounds lead 2TC. Reed relay 2TCS operates, and connects lead 2AS to the second winding of reed relay 2AX, lead 2ASR to the first winding of reed relay 2AX, lead 2PC to lead 2PLC, lead 3ROS to reed relay 3OS, lead 3LO to reel relay 3CXR and 3TT, lead 2CNCL to reel relay 2CNC, and lead 2PMCL to the first winding of reed relay 2PMC.

Figure 5:
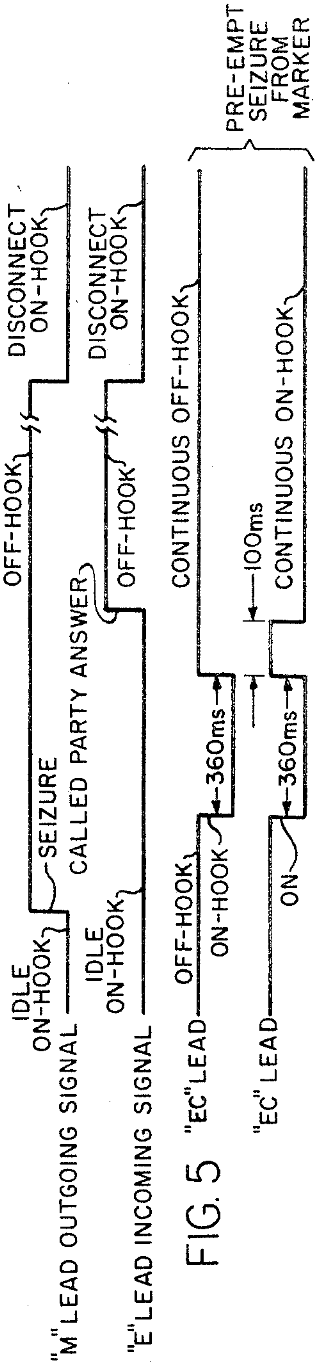
FIG. 5 is a chart showing the condition of the signal leads during various phases of a call.

The marker then grounds lead 2PMT to operate reed relay 2PRE in series with resistor 2R17, and grounds lead 2PMCL. Reed rel ιy 2PMC operates from the ground on lead 2PMCL. Reed relay 2PRE operates to complete a circuit to reed relay 3OG. Reed relay 3OG operates and opens the circuits to reed relay 3INS. Reed relay 3INS restores and opens the circuit to relay 3INC which restores. During the "on-hook" portion of the pre-empt signal, the marker removes ground from lead 2PMCL, opening the circuit to the first winding of reel relay 2PMC. Reed relay 2PMC restores, thus repeating the "on-hook" indication via lead 2EC as shown in FIG. 5 and the first winding of reed relay 2OSR, and opens the circuit of relay 3OSS. Relay 3OSS restores, opens the circuit of relay 3OB, and transfers lead 3M from its "seized" to its "normal" state as shown in FIG. 5. After its slow-to-release interval, relay 3OB restores. After approximately 345 ms., the marker again grounds lead 2PMCL to close the circuit to the first winding of reed relay 2PMC. Reed relay 2PMC operates, repeates the "off-hook" indication via lead 2EC, and recloses the circuit to relay 3OSS. Relay 3OSS again operates to transfer lead 3M from its "normal" to its "seized" state, and also operates relay 3OB.

The marker then grounds lead 3TTL to operate reed relay 3TT. Reed relay 3TT operates, closes 3BIS, and disconnects leads 2HLA and 2HLC from the second and first windings of reed relay 2CO, respectively, opening the circuit of 2CO and the matrix. Reed relay 3BIS operates, locks, and disconnects lead 3E from reed relay 3ISR, releasing it. This removes resistance 3R8 battery from lead 3COP, disconnects lead 3LO from reed relay 3TT, and opens the circuit to reed relay 2CH. Reed relay 3ISR restores and opens the circuit of 3IB. Reed relay 2CH restores, disconnects lead 2EC from 2OSR, opens the circuits of 2OSR and 3TCT, connects resistance 2R1 battery to lead 2SBC–O, and completes a circuit to reed relay 2MK and the second winding of reed relay 2PMC. Reed relay 2OSR, 3TCT restores. This disconnects leads T1, R1, T, and R from leads T1, R1, T, and R, respectively. Reed relay 2MK operates and closes a circuit to relay 2TIS. The marker then removes ground from leads 2PMT, 2PMCL and 3TTL, opening the circuit to reed relay 2PRE, the first winding of 2PMC and 3TT, respectively. Reed relay 2PRE restores. Reed relay 3TT restores and connects leads 2HLA and 2HLC to the second and first windings of reed relay 2CO, respectively. The marker grounds lead 2AS to operate reed relay 2AX which locks via its first winding in series with resistor 2R5 and lead 2ASL to connect resistance 2R1 battery to lead 2SBA–O, and lead 2PA to lead 2PLA. The marker removes ground from lead 2TC, releasing reed relay 2TCS, removes ground from lead 3CM and resistance battery from lead 3PTG, restoring reed relay 3TC, and removes ground from lead 2AS, opening the circuit to the second winding of reed relay 2AX. Reed relay 2TCS upon restoring disconnects lead 2PC from lead 2PLC, lead 2AS from reed relay 2AX, lead 2ASR from the first winding of reed relay 2AX, lead 2PMCL from the first winding of reed relay 2PMC, lead 3ROS from reed relay 3OS, and lead 3LO from reed relay 3CXR. Reed relay 3TC restores, and disconnects lead 2SBC–O from resistance 2R1 battery, lead 2TIPL from reed relay 2TIP, lead 3MAB–O from resistance 3R10 battery, lead 3TTL from reed relay 3TT, lead 2TC from reed relay 3TCS, and lead 2PMT from reed relay 2PRE. After its slow-to-release interval, relay 3IB restores. Relay 2TIS operates and locks from ground potential through the back contacts of relay 3IB. When the distant switch releases the existing matrix connection, ground is removed from lead 3E.

Further operation is similar to that described earlier in the section titled "Matrix Operation," with the exception that the operation of reed relay 2CH as there described opens the circuit to the second winding of reed relay 2PMC to release it and closes 3TCT. Reed relay 2PMC restores and opens the circuit of relay 3BIS. Reed relay 3BIS restores and connects lead 3E to reed relay 3ISR.

From distant switch

During the "on-hook" portion of the pre-empt signal, ground is removed from lead 3E, opening the circuit to reed relay 3ISR. Reed relay 3ISR restores, closes a circuit to relay 3IC, opens the circuit of relay 3IB, and repeats the "on-hook" indication via lead 2EC and the first winding of reed relay 2OSR to the succeeding equipment. Relay 3IC operates. After its slow-to-release interval, relay 3IB restores, opens the circuit to relay 3IC and closes the circuit to relay 2PMT. Relay 2PMT operates to its "X" contacts, and then operates fully. During the "off-hook" portion of the pre-empt signal, ground is connected to lead 3E, to operate reed relay 3ISR. Reed relay 3ISR operates, recloses the circuits to relay 3IB and 3IC, and reed relay 3INS, and repeats the "off-hook" indication via lead 2EC and the first winding of reed relay 2OSR. Reed relay 3INS operates and completes an operating path for relay 3INC. Relay 3INC operates and opens the circuit of reed relay 3OG. Reed relay 3OG restores. Relay 3IB operates, completes a path to the first winding of relay 2RG in magnetic opposition to its second winding and opens the circuits to relay 3IC and 2PMT. Relay 2RG restores and opens circuits to both of its windings. If no new call is to be completed, ground is removed from lead 3E, releasing 3ISR. Reed relay 3ISR restores, closes a path to relay 3IC, opens the path to relay 3IB, and repeats the "on-hook" indication via lead 2EC and the first winding of reed relay 2OSR. After its slow-to-release interval, relay 2PMT restores to its "X" contacts, completing the circuit to reed relay 3TT. Reed relay 3TT operates and disconnects leads 2HLA and 2HLC from the second and first windings of reed relay 2CO respectively releasing it and the matrix. Reed relay 2CO restores, and opens the circuits of reed relays 3TI and 2CH. Reed relay 3TT restores and again connects leads 2HLA and 2HLC to the windings of reed relay 2CO. Reed relay 2CH restores, disconnects lead 2EC from reed relay 2OSR, and also opens the circuit to the second winding of 2OSR and 3TCT.

Reed relay 2OSR restores and opens the circuit of relay 3OSS. Reed relay 3TCT restores and disconnects leads T1, R1, T, and R on the matrix side from leads T1, R1, T, and R of the trunk side. Relay 3OSS restores, opens the circuit of relay 3OB, and transfers lead 3M from its "seized" to its "normal" state.

New call

If the distant switch remains connected to this trunk, ground is maintained on lead 3E, holding reed relay 3ISR operated. After its slow-to-release interval, relay 3IC restores to remove the ground, leave the resistance 3R4 battery on lead 3CM to provide a call for service. After its slow-to-release interval, relay 3OB restores. Further operation is the same as described under the headings "Incoming Call—Request for Service."

No new call

If no new call is to be completed, ground is removed from lead 3E as previously described. After its slow-to-release interval, relay 3IB restores, closes a circuit to relay 2PMT, and opens the circuit of relay 3IC. Relay 2PMT operates to its "X" contacts, and then operates fully. After its slow-to-release interval, relay 3OB restores. After its slow-to-release interval, relay 3IC restores, and opens the circuits to relay 2PMT and reed relay 3INS. Reed relay 3INS restores and opens the circuit of relay 3INC. Relay 3INC restores and opens the circuit of relay 3CCS. After its slow-to-release interval, relay 2PMT restores. After its slow-to-release interval, relay 3CCS restores, connects lead 2MB to relay 2TST, extinguishes lamp 3BUSY, and disconnects lead 3TK from 3TG. The circuit is now at normal.

Pre-empt signal from matrix

The pre-empt signal is received via lead 2EC. During the "on-hook" portion of the pre-empt signal, resistance battery via lead 2EC flows through the first winding of reed relay 2OSR in magnetic opposition to that in its second winding. Reed relay 2OSR restores and opens the circuit of relay 3OSS. Relay 3OSS restores, opens the circuit of relay 3OB, and transfers lead 3M from its "seized" to its "normal" state. After its slow-to-release interval, relay 3OB restores. During the "off-hook" portion of the pre-empt signal, ground via lead 2EC short circuits the first winding of reed relay 2OSR. Reed relay 2OSR operates and completes the circuit to relay 3OSS. Relay 3OSS operates, completes the circuit to relay 3OB and transfers lead 3M from its "normal" to its "seized" state. Relay 3OB operates.

When the matrix is released, reed relay 2CO is opened. Reed relay 2CO restores and opens the circuit of reed relay 2CH. Reed relay 2CH restores, disconnects lead 2EC from reed relay 2OSR, and opens the circuits to reed relays 2OSR and 3TCT. Reed relay 2OSR restores and opens the circuit of relay 3OSS. Reed relay 3TCT restores and disconnects leads T1, R1, T, and R on the matrix side from leads T1, R1, T, and R of the trunk facility side. Relay 3OSS restores, opens the circuit to relay 3OB and transfers lead 3M from its "seized" to its "normal" state.

When the distant switch releases, ground is removed from lead 3E, opening the circuit of reed relay 3ISR. Reed relay 3ISR restores, closes a circuit to relay 3IC and opens a circuit to relay 3IB. Relay 3IC operates.

During outgoing call

After its slow-to-release interval, relay 3OB restores, and opens the circuit to reed relay 3OG and the second winding of relay 2RG. Reed relay 3OG restores and opens the circuit of relay 3CCS. Relay 2RG restores. After its slow-to-release interval, relay 3IB restores, closes a circuit to relay 2PMT, and opens the circuit of relay 3IC. Relay 2PMT operates to its "X" contacts and then operates fully. After its slow-to-release interval, relay 3CCS restores, connects lead 2MB to relay 2TST, extinguishes lamp 3BUSY, and disconnects lead 3TK from lead 3TG. After its slow-to-release interval, relay 3IC restores and opens the circuit of relay 2PMT. After its slow-to-release interval, relay 2PMT restores. The circuit is now at normal.

During an incoming call

After its slow-to-release interval, relay 3OB restores and opens the circuit to relay 2RG. Relay 2RG restores. After its slow-to-release interval, relay 3IB restores, closes the circuit to relay 2PMT, and opens the circuit to relay 3IC. Relay 2PMT operates to its "X" contacts, and then operates fully. After its slow-to-release interval, relay 3IC restores and opens the circuits to reed relay 3INS and relay 2PMT. Reed relay 3INS restores and opens the circuit to relay 3INC. Relay 3INC restores and opens the circuit to relay 3CCS. After its slow-to-release interval, relay 2PMT restores. After its slow-to-release interval, relay 3CCS restores, connects lead 2MB to relay 2TST, extinguishes lamp 3BUSY, and disconnects lead 3TK from lead 3TG. The circuit is now at normal.

What is claimed is:

1. In a communication switching system, including a plurality of switching centers interconnected by trunk-lines, wherein each said center comprises a switching network, marker apparatus for controlling the establishment of connections through said center; a plurality of lines of at least a first and a second higher precedence ranking and a plurality of said trunk lines connected to each said center, each said line having a line circuit and each said trunk line having a trunk circuit terminating it at the switching network, means responsive to a calling line service request signal from one of said lines in a first one of said switching centers to identify the calling line and means including the marker apparatus to cause a connection to be established through said switching network to common control means wherein call signals comprising the directory number of a called line in another center are registered and processed to then cause the marker apparatus to establish a connection from said calling line to said called line via a particular trunk circuit, the improvement comprising means in said common control effective after the establishment of a connection via a particular trunk circuit, in the event a subsequent connection by a line of higher precedence must utilize said particular trunk circuit for the establishment of a communications link, for indicating to said trunk circuit that it is to be pre-empted, first means in said particular trunk circuit responsive to said indication to return a first pre-empt signal through said switching network to indicate to said then connected line that the call is being interrupted, and second means in said particular trunk circuit operative to forward a second pre-empt signal via its associated trunk line to said other switching center trunk circuit.

2. Apparatus in accordance with claim 1 wherein said trunk circuit in said other switching center includes means operative to recognize said second pre-empt signal from said associated trunk line, and to then activate other means for sending a third pre-empt signal via the there connected switching network.

3. Apparatus in accordance with claim 2 wherein said connected trunk circuit in said other switching center includes release means operated to release itself after said third pre-empt signal is sent through the switching network.

4. Apparatus in accordance with claim 2 wherein said trunk circuit in said first one of said switching centers includes means operated for applying a continuous off-hook signal following said pre-empt signal and said connected trunk circuit in said other switching center includes means operated in response to said off-hook signal from said trunk line following said second pre-empt signal to operate a request means for the connection thereto of register-sender means.

5. Apparatus in accordance with claim 1 including relay means in said trunk circuit in said other switching center operated in response to receipt of said pre-empt signal from said trunk line to repeat said signal via a control lead through said switching network, whereby a connected line circuit is operated to apply a tone to the station and be released from the connection, said trunk circuit in said first one of said switching centers includes means operated for applying an off-hook signal following said pre-empt signal and other means in said trunk circuit in said other switching center operated in response to the continuous off-hook signal following said pre-empt signal to signal said associated marker to establish a connection from said other trunk circuit to the common control means.

6. In a communication switching system including a plurality of switching centers interconnected by trunk lines including at least a first, a tandem second and a third switching center wherein each said center comprises a switching network, marker apparatus for controlling the establishment of connections through said center, a plurality of lines of at least a first and second higher precedence ranking and a plurality of said trunk lines connected to each said center, each said line having a line circuit and each said trunk having a trunk circuit terminating it at each switching network, means responsive to a calling line service request signal from one of said lines to identify the calling line and means including the marker apparatus to cause a connection to be established through said switching network to common control means wherein call signals comprising the directory number of a called line in said third center accessible via said tandem center are registered and processed to then cause the marker apparatus to establish a connection from said calling line to a trunk circuit to said tandem center and to then forward such information as necessary for said tandem exchange to further extend said calling connection, the improvement comprising means in said common control in said tandem switching center effective after the establishment of a connection via a particular trunk circuit to said third center where a subsequent connection by a line of higher precedence must utilize said particular trunk circuit for the establishment of a communications link via the trunk line associated with said trunk circuit for indicating to said trunk circuit via said marker apparatus that it is to be pre-empted, first means in said particular trunk circuit responsive to said indication to send a first pre-empt signal through said switching network to indicate to said then connected trunk to said first switching center that the call is being interrupted, and second means in said particular trunk circuit operative to forward a second pre-empt signal via its associated trunk line to the trunk circuit of said third switching center, said first means in said particular trunk circuit thereafter controlled by said common control means to indicate to said associated trunk line connected equipment to prepare for the setting up of a new connection.

7. Apparatus in accordance with claim 6 wherein said trunk circuit receiving said first pre-empt signal through said switching network includes means to extend said signal via its associated trunk line and then release itself.

8. Apparatus in accordance with claim 7 wherein each said pre-empt signal consists of a 360 millisecond on-hook signal followed by a 100 millisecond off-hook signal and then a continuous on-hook signal.

References Cited

UNITED STATES PATENTS 3,190,966 6/1965 James et al.

KATHLEEN H. CLAFFY, Primary Examiner

T. W. BROWN, Assistant Examiner